(12) United States Patent
Bless et al.

(10) Patent No.: US 7,961,598 B2
(45) Date of Patent: Jun. 14, 2011

(54) RAPID RESPONSE METHOD FOR THE FAILURE OF LINKS BETWEEN DIFFERENT ROUTING DOMAINS

(75) Inventors: Roland Bless, Karlruhe (DE); Gotz Lichtwald, Lichtenau/Ulm (DE); Markus Schmidt, Schutterwald (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 10 days.

(21) Appl. No.: 12/333,028

(22) Filed: Dec. 11, 2008

(65) Prior Publication Data

US 2009/0185484 A1      Jul. 23, 2009

Related U.S. Application Data

(63) Continuation of application No. 10/546,136, filed as application No. PCT/EP2004/001171 on Feb. 9, 2004, now abandoned.

(30) Foreign Application Priority Data

Feb. 28, 2003      (EP) .................................... 03004532

(51) Int. Cl.
*H04L 12/26* (2006.01)
(52) U.S. Cl. .......................... 370/218; 370/222; 370/244
(58) Field of Classification Search .................. 370/216, 370/225, 227
See application file for complete search history.

(56) References Cited

U.S. PATENT DOCUMENTS

2002/0131362 A1* 9/2002 Callon ........................... 370/216

OTHER PUBLICATIONS

Toshifumi Miyagi, Masataka Iizuka and Masahiro Morikura, "A Novel Route Reconstruction Protocol for P-MP Communication over Wireless Ad-hoc Network", VCT 2000-Spring, 2000 IEEE 51st, Vehicular Technology Conference Proceedings, Tokyo, Japan, May 15-18, 2000, IEEE Vehicular Technology Conference, New York, NY: IEEE, US, vol. 2 of 3. Conf. 51, May 15, 2000, pp. 1522-1526, XP-000968125.
Y. Rekhter and T. Li, "A Border GatewayProtocol 4 (BGP-4)", IETF/RFC 1771, Online, Mar. 1995, pp. 1-57, XP-002226832, Retrieved from Internet URL: http://www.faqs.org/rfcs/rfc1771.html, Retrieved on May 9, 2003.

* cited by examiner

*Primary Examiner* — Seema S Rao
*Assistant Examiner* — Wanda Z Russell
(74) *Attorney, Agent, or Firm* — Laurence A. Greenberg; Werner H. Stemer; Ralph E. Locher

(57) ABSTRACT

The invention relates to a rapid response method for the failure of a link between two routing domains in a packet-oriented network. Once the failure of a link has been identified, substitute routes are provided for the interrupted routes by the local selection of alternative routes and by the propagation of messages along the substitute routes. In contrast to conventional inter-domain protocols such as the BGP (Iborder gateway protocol) the transmission of messages and the associated modification to the routing only involves routing domains that lie along the replacement routes. In one embodiment, a network-wide propagation of messages takes place if the failure of the link represents a persistent breakdown. As a consequence, optimal routes are re-determined in the entire network. The invention provides breakdown compensation that is appropriate for temporary breakdowns and prevents instabilities that occur as a result of the use of conventional inter-domain protocols.

18 Claims, 4 Drawing Sheets

RAPID RESPONSE METHOD FOR THE FAILURE OF LINKS BETWEEN DIFFERENT ROUTING DOMAINS

CROSS REFERENCE TO RELATED APPLICATIONS

This application is the US National Stage of International Application No. PCT/EP2004/001171, filed Feb. 9, 2004 and claims the benefit thereof. The International Application claims the benefits of European application No. 03004532.2, filed Feb. 28, 2003, both applications are incorporated by reference herein in their entirety.

FIELD OF INVENTION

The invention relates to a rapid response method for the failure of a link between two routing domains in a packet-oriented network.

SUMMARY OF THE INVENTION

The invention lies within the field of Internet technologies or, more specifically, in the field of routing methods in packet-oriented networks, and is directed at the transmission of data under real-time conditions.

Currently, by far the most important development in the field of networks is the convergence between voice and data networks. An important future scenario is that data, speech and video data will be transmitted over a packet-oriented network, whereby newly-developed network technologies ensure adherence to the requirements characteristic of the various classes of traffic. Future networks for the various types of traffic will work on a packet-oriented basis. Current development activities relate to the transmission of speech data over networks conventionally used for data traffic, primarily IP (Internet Protocol) based networks.

In order to permit voice communication over packet networks, and in particular IP-based networks, with a quality which corresponds to that of speech transmission over circuit-switched networks, such quality parameters as for example the delay of data packets or the jitter must be kept within narrow limits. In the case of speech transmission, it is of major importance for the quality of the service offered that the delay times do not significantly exceed values of 150 milliseconds. In order to achieve a correspondingly small delay, work is in progress on improved routers and routing algorithms, which are intended to permit faster processing of the data packets.

In the case of routing through IP networks, a distinction is usually made between intra-domain and inter-domain routing. For a data transmission over the Internet, it is common for networks—one speaks here of subnetworks, domains or so-called autonomous systems—from several network operators to be involved. The network operators are responsible for the routing within the domains which fall into their area of responsibility. Within these domains they have the freedom to adapt the approach to routing as they wish, provided only that the quality of service characteristics can be adhered to. A different situation is represented by routing between various domains in which various domain operators establish links with each other. Inter-domain routing is made more complicated by the fact, on the one hand, that the paths determined through the various domains to the destination should be the most optimal possible, but on the other hand the domain operators can use local strategies, which makes it more difficult to calculate paths which are globally optimal, according to objective criteria. For example, one strategy is to avoid the domains of network operators in a particular country for traffic from a particular source. However, this strategy is not in general known to all the network operators with domains through which the traffic is routed, i.e. a network operator must make a local decision about the domain to which he forwards traffic, without full information being available about the optimal path as determined by some metric. The strategies are also often referred to by the English term "policies".

For routing between various domains, use is made of so-called exterior gateway protocols, EGPs. In the Internet, the Border Gateway Protocol Version 4 (border gateway protocol is often abbreviated to BGP), as described in more detail in RFC (Request For Comments) 1771, is currently more often than not used. The border gateway protocol is a so-called path-vector protocol. A BGP instance (the term "BGP speaker" appears frequently in English-language literature) is informed by its BGP neighbors about possible routes to the destinations which can be reached via the BGP neighbor concerned. Using path attributes, details of which are supplied at the same time, the BGP instance contains for the reachable destinations what are, from its local point of view, the optimal routes in each case. In the context of the BGP protocol, four types of messages are exchanged between BGP instances, including a so-called update message with which route data is propagated throughout the entire network, and which permits the network to be optimized for topology changes. The emission of update messages usually leads to modification of the path data in all the network's BGP instances, for the purpose of optimizing the routings according to the data available locally. Apart from this a part is played by so-called keep-alive or status confirmation messages, by which a BGP instance informs its BGP neighbors about its operability. In the absence of these messages, the BGP neighbors make the assumption that the link to the BGP instance is disrupted.

The propagation of topology data by means of the BGP protocol has the disadvantage that, when there are frequent change reports, a substantial load occurs from the messages propagated through the network to report the changes, and that the network does not converge to a new state if the change messages follow one another too rapidly. This problem, that the network does not converge to a new state, or that the inter-domain routing does not become stable, has been tackled by the so-called route-flap damping approach. The idea of this concept is to apply a sanction to the report of a change made by a BGP neighbor. On receipt of a change message, the damping parameter is increased and, if the damping parameter exceeds a threshold, change messages are ignored. In the absence of change notices, the value of the damping parameter is reduced. As a consequence of this, change notices from BGP instances are ignored if the frequency of the change notices is too high. The response of the network to temporary instabilities is thereby slowed or diminished. However, the method has the disadvantage that the response of the network to malfunctions which are more long-lasting (the expression "persistent errors" is used here) is delayed. In relation to real-time traffic, above all, it is disadvantageous if malfunctions in the Internet routing are only eliminated over a longer timescale.

The object of the invention is to specify a method which permits a rapid response to malfunctions during inter-domain routing and, at the same time, avoids the disadvantages of conventional methods.

This object is achieved by the claims.

In accordance with the invention, when a link between two routing domains fails, a substitute route or substitute path, as applicable, is provided. The inter-domain routing along this substitute route is set up in such a way that data packets which would normally be routed via the disrupted link are diverted along the substitute route to their destination. Here, 'the term link failure refers to any malfunction which interrupts the connection or connectivity between two routing domains.

A routing domain (the expressions "autonomous system" or "subnetwork" are also found in the literature) is characterized by unified routing within the domain. For example, within a domain packets may be routed using the OSPF (open shortest path first) protocol. Here, we present a measure for routing between domains—referred to below as inter-domain routing—which permits a rapid response to failures on links between domains. In this situation, the link failure is detected by one routing domain. This could be, for example, by a router in the routing domain, which is equipped with protocol software for inter-domain routing. In the case of the BGP protocol we speak in such a case of a BGP speaker or a BGP instance. After the failure has been detected, the message about the link failure is propagated, but not throughout the entire network but only along one or more substitute routes. Routers along the substitute route(s) adjust their inter-domain routing in such a way that packets can be routed along the substitute route(s). This is effected, for example, by changes to the routing tables for those routers belonging to the domains along the substitute route which have inter-domain protocol functionality. Further propagation of a message about the link failure along the substitute route by an EGP routing instance can be omitted if the EGP routing instance already provides a routing, to the destination of the substitute route, which avoids the link which has failed. This can arise as a result of the topology of the network or alternatively due to the EGP routing instance having already had a notification from the opposite direction, e.g. originating from another EGP instance which has been informed of the link failure.

Routers with inter-domain protocol functionality are also referred to below as EGP instances. EGP (Exterior Gateway Protocol) is in this case a generic expression for inter-domain protocols such as, for example, the BGP protocol. The setting of the inter-domain routing for a domain on the substitute route can be effected in the following way: an EGP instance receives a notification of the link failure. At this point, the EGP instance selects an alternative route for a route which passes via the link which has failed. The EGP instance provides alternative routes, for example, from update messages in the BGP protocol, which have been propagated in the network and used by the EGP instance for the purpose of determining multiple routes to different destinations. The next routing domain on the alternative route can be identified by reference to the alternative route. The address of a router—as a rule an EGP instance—can then be specified as the next destination or next hop, as applicable, for the routing in the EGP instance's routing table.

Here and in what follows, the following distinction is made between a substitute route and an alternative route. The substitute route is the route which is specified, on the basis of the method in accordance with the invention, for routing via a route which includes the link which has failed. The alternative route refers to a local choice of route as an alternative to the route which has failed. With the method, data can propagated about not only the link which has failed, but also about the selected alternative route. However, in the preferred variant, this is not done but instead an alternative route is always selected by the routing domains lying on the substitute route, on the basis of the data about the link failure. The reason for this is that different strategies (policies) are often applied by the individual network operators, these being generally not known to the other network operators. Hence, it is often only possible for a routing domain to make a decision which is locally valid, i.e. in relation to the routing, a decision about the next destination along an alternative route. An alternative route which is locally selected can, but does not necessarily have to, coincide with the substitute route which is ultimately produced. It is thus possible for a routing domain to make a choice of alternative route which does not coincide with the choice by the routing domains which come before the substitute route.

The invention has the advantage that it is possible to react rapidly to a malfunction, without it being necessary to effect the propagation of messages throughout the entire network followed by convergence on a new state in terms of the topology. In particular, for malfunctions which are of limited duration, no resource-intensive fault response need take place.

Under a development, the routing domains which are first informed of the malfunction, or the routing domains which are, for example, at the two ends of a disrupted link, initiate the provision of substitute routes for all the routes which pass along the disrupted link. For a disrupted route, it is also possible to provide two or more substitute routes, where the additional substitute routes which are provided can be used as a backup or for the implementation of policies.

In a further development, provision is made for identifying more than one alternative path. The additional alternative path(s) can then be used as a substitute for the preferred path or for a routing which depends on the routing strategies. For example, a decision may be made about which alternative path should be used by reference to data in the packet header.

In a variant, a protocol is specified, to provide for a network-wide propagation of messages for the calculation of optimal routes, for example the BGP protocol. Under this variant, when a link fails the redetermination of optimal routes for the inter-domain routing, to take into account the link failure, is suppressed for a period of time by means of the protocol. In the case of the BGP protocol, for example, the BGP process, on the router to which the link malfunction has been reported, is restrained from sending update messages to other BGP instances. In addition, the router which is neighboring to the link malfunction can act as a proxy for EGP instances which can no longer be reached, and can send keep-alive messages to mimic the orderly functioning of the link which has failed to the BGP processes of other BGP instances. This function, of suppressing messages, can be disabled after the period of time, so that a second propagation of messages takes place for the purpose of determining optimal routes. This development has the advantage that it is possible to distinguish between short-term and longer lasting ("persistent") malfunctions, whereby the response to short-term malfunctions is the provision of substitute routes and for longer-term malfunctions an appropriate modification of the topology within the overall network is initiated.

For the handling of short-term malfunctions, it is helpful in addition to identify the route which is replaced by the substitute route, in such a way that it is ready for use again when a message is received about the restoration of the link.

The subject matter of the invention is explained in more detail below in the context of an exemplary embodiment, by reference to figures.

DETAILED DESCRIPTION OF INVENTION

Figure 1:
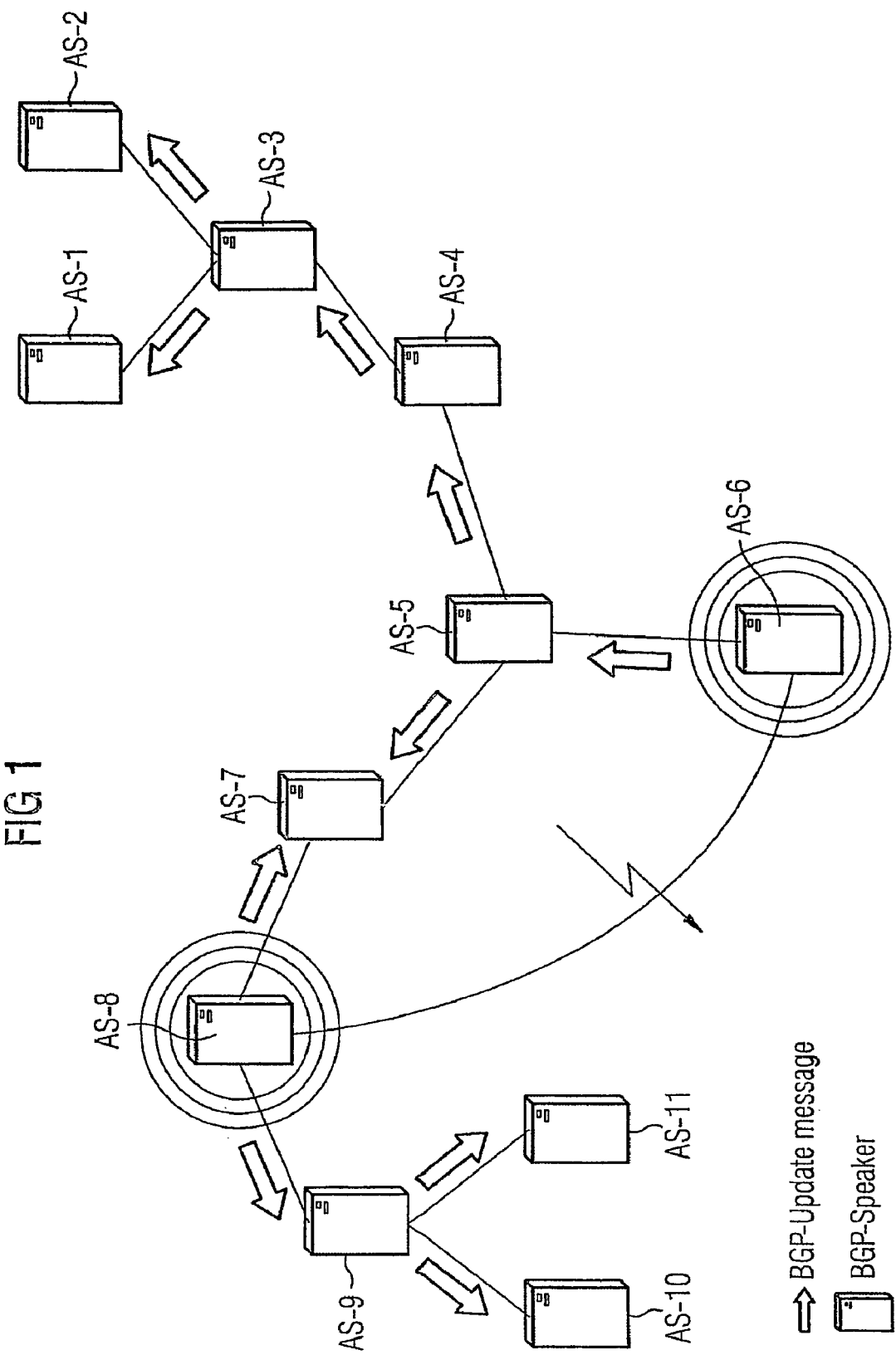
FIG. 1 shows a conventional response when a link fails, using BGP inter-domain rerouting.

FIG. 1 shows eleven autonomous systems or routing domains AS-1 to AS-11 together with links which connect these autonomous systems to each other. The autonomous systems communicate with each other with the help of the BGP protocol, whereby individual routers in the autonomous systems are equipped with appropriate protocol capabilities. Here, we use the terms BGP speakers or BGP instances. With the help of these BGP instances, the autonomous systems exchange messages with each other, either confirming the stored state or giving information about changes which should be taken into account in routing. FIG. 1 indicates how the system responds to a link failure, under the control of the BGP protocol. In this case the link between the autonomous systems AS-6 and AS-8 is disrupted. As the response to the malfunction—the response is indicated by the arrows—so-called update messages are propagated through the whole network, or the eleven autonomous systems AS-1, ..., AS-11 receive update messages, as applicable, prompting them to recalculate routes which are optimal in terms of a local metric.

Figure 2:
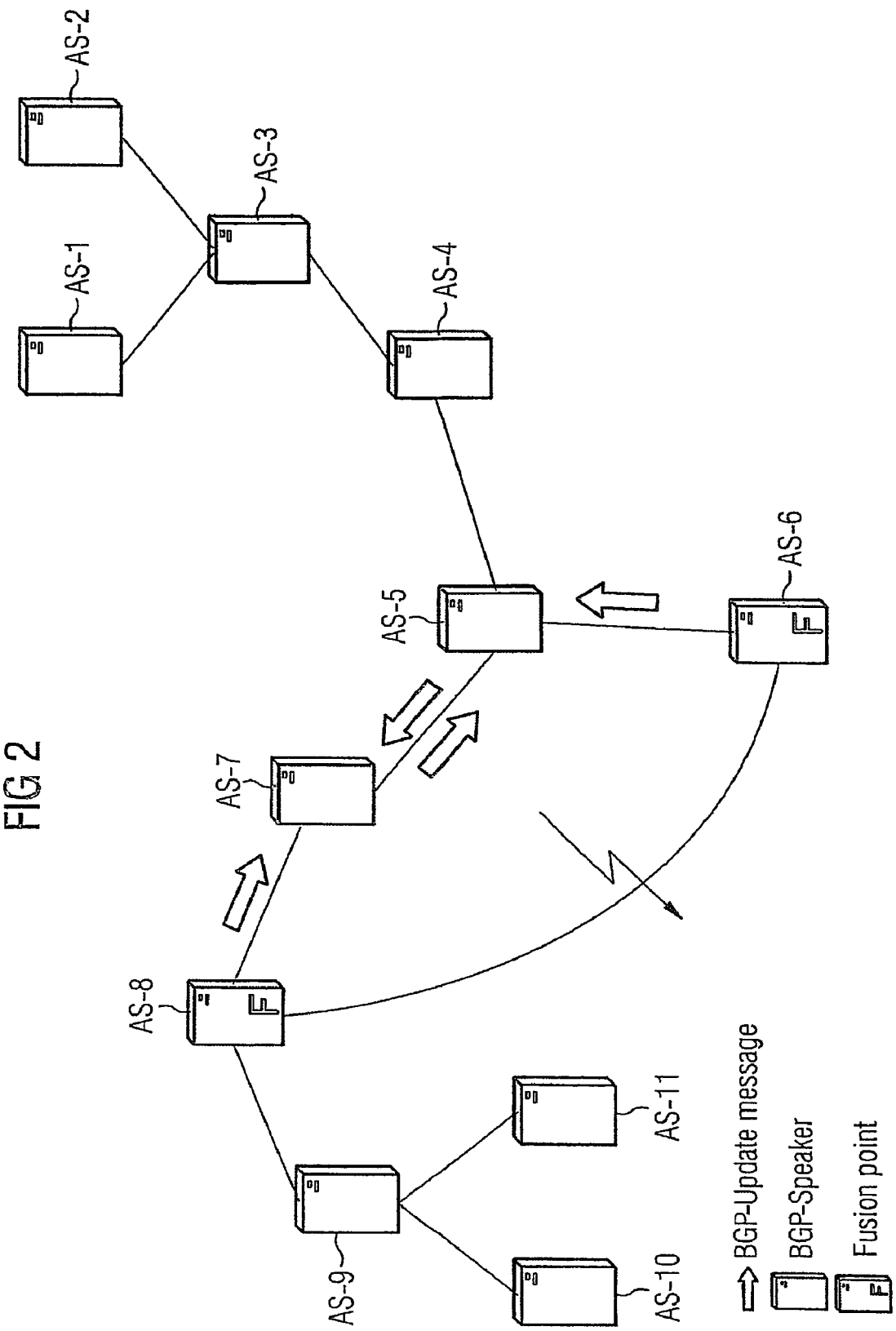
FIG. 2 shows a response in accordance with the invention to the failure of a link.

FIG. 2 shows the same network of autonomous systems as in FIG. 1. FIG. 2 shows a rapid response in accordance with the invention to the failure of the link between the autonomous systems AS-6 and AS-8. In accordance with the invention, messages are sent to autonomous systems which lie on substitute routes for routes which pass along the failed link. The autonomous system AS-8 sends messages about the link failure to the autonomous system AS-7, and this in turn to the autonomous system AS-5. Since the autonomous system AS-8 can reach all the autonomous systems in the right-hand half of the figure, i.e. the autonomous systems AS-1 to AS-4 and AS-6, via the autonomous systems AS-7 and AS-5, the autonomous system AS-5 does not need to propagated further the message about the link failure which it received from AS-8. In an analogous way, the autonomous system AS-6 sends a message to the autonomous system AS-5. The latter then informs the autonomous system AS-7. It is thus the autonomous systems AS-5 to AS-8 which are affected by the link failure, and which provide or identify, as applicable, substitute routes for the routes which pass along the failed link. In contrast to the conventional response shown in FIG. 1, no messages need to be propagated over the whole network. In the figure, the autonomous systems AS-1 to AS-4 and AS-9 to AS-11 receive no messages about the link failure, and do not need to make any modifications.

Figure 3:
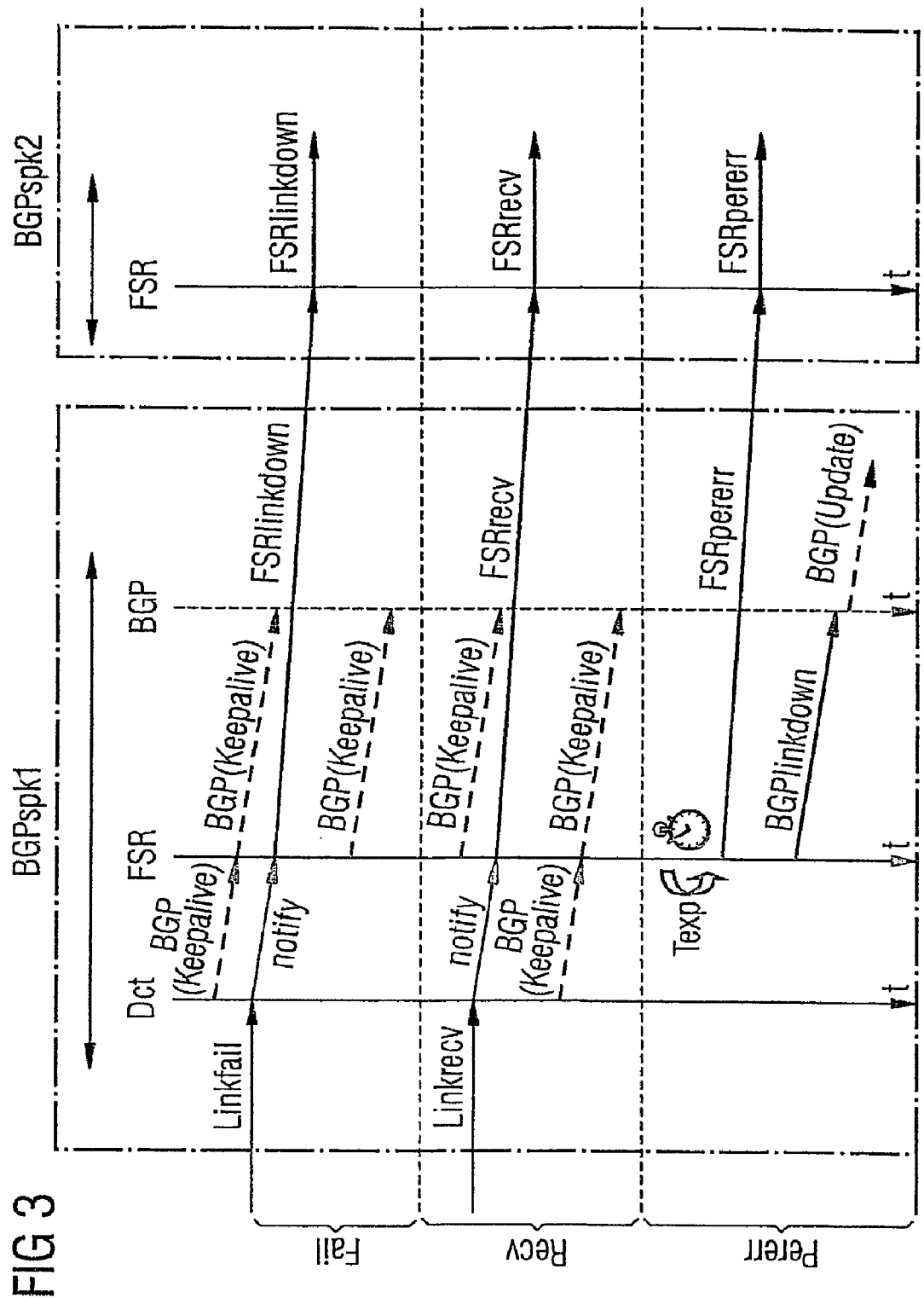
FIG. 3 shows a flow diagram of the protocol.

In the case of a link failure which lasts longer (a persistent error), it is logical to propagate messages through the entire network, to optimize the routing throughout the network. For this reason provision is made as shown in FIG. 3 for propagating BGP update messages in the whole field if the failed link has not recovered after a certain period of time, for example 10 minutes. The vertical axis in FIG. 3 shows three different phases of the method in accordance with the invention, namely the phase (Fail) in which the link failure is recognized, the phase (Recv) in which a recovery of the link is signaled if this takes place within the time period, and a phase (Pererr) which shows the procedure if the fault concerned is a longer lasting one. On the horizontal axis are shown two BGP speakers or BGP instances, namely BGPspk1, a BGP instance to which the fault is directly signaled, that is it belongs to the autonomous system which is adjacent to the failed link, and the BGP instance BGPspk2, which belongs to an autonomous system which is informed of the link failure by the BGP instance BGPspk. Three software or protocol modules, as applicable, of the first instance BGPspk1 are shown, namely DCT (detection), a module which detects the link failure, the module FSR (fast scope rerouting) which deals with the response in accordance with the invention or the emission of messages, as applicable, and BGP, the corresponding BGP protocol software (in this connection, one refers also to a BGP routing engine). For the second BGP instance, the fast scope rerouting module FSR is shown. In this diagram, the time axes run from above to below, i.e. messages or events, as applicable, which appear further down are later in time. Before the notification of the link failure, Linkfail, so-called keepalive messages, BGP (Keepalive), provided by the BGP protocol are forwarded to the BGP software, BGP, within the first BGP instance, BGPspk1, i.e. orderly functioning of the link is being signaled. After the failure of the link, the malfunction is detected, for example by the absence of keepalive messages, BGP (Keepalive) (in FIG. 3, the detection of the link failure corresponds to the Linkfail message). The FSR software is informed of link failure (the corresponding message in FIG. 3 is called 'notify'). The FSR software in BGP instance 1, BGPspk1, sends a message, FSRlinkdown, to the FSR software in BGP instance 2, BGPspk2, which in turn sends a corresponding message, FSRlinkdown, along a substitute route or numerous substitute routes, as applicable. The message FSRlinkdown notifies the receiver instance concerned about the link failure, and at the receiver initiates a rapid response to the link failure, in accordance with the invention. During the rapid response to the link failure, regular functioning of the link which has failed is simulated at the BGP protocol level. For this purpose, the FSR software FSR in the first BGP instance, BGPspk1, sends BGP keepalive messages, BGP (Keepalive), to the BGP software BGP. The FSR software FSR acts, so-tospeak, as a proxy for the BGP instance at the other end of the failed link, to block any recalculation of routes in the network by the BGP protocol.

If, before the time period expires, the operability of the link is restored again, and the first BGP instance BGPspk1 is informed of this (in the diagram this is indicated by the message Linkrecv), the FSR software FSR in the first BGP instance, BGPspk1, uses the message FSRrecv to inform the second BGP instance, BGPspk2, that the link has gone back into service. This FSRrecv message is propagated along the substitute route. After receiving the message about the failure of the link, the BGP instances which lie along the substitute route will have replaced the routes which pass via the failed link by other routes, and will have identified the substituted routes as temporarily unavailable. The routes identified in this way can be put back into service again after the message about the recovery of the link is received. After the failed link has recovered, the first BGP instance, BGPspk1, will again receive BGP keepalive messages, BGP (Keepalive) via the link which has gone back into service.

The third period Pererr (standing for 'persistent error') shows the response in the case of longer-lasting link failures. After a timer Texp (Timer Expired) has expired, FSR software FSR in the first BGP instance, BGPspk1 sends a message FSRpererr (standing for 'FSR persistent error') to the second BGP instance BGPspk2, by which it signals that the fault is a longer lasting one. The routes which are marked as temporarily unavailable can now be removed from the routing table(s). The FSR software FSR of the first BGP speaker, BGPspk1, now no longer simulates to the BGP software the operability of the link which has failed, but instead sends a notification BGPlinkdown which informs the BGP software BGP about the failure of the link. As the response at this point, BGP update messages (Update) are propagated throughout the entire network, and initiate a recalculation of the routes.

Figure 4:
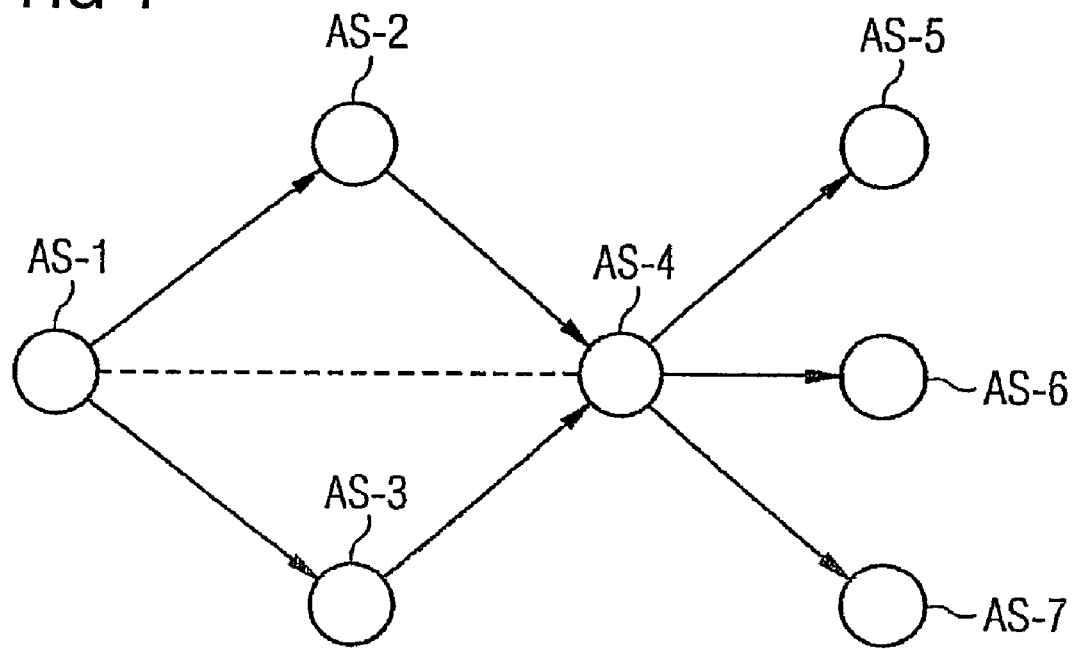
FIG. 4 shows a use of routing arrays for the purpose of taking into account routing strategies.

Generally, the selection of alternative routes through the routing domains or BGP instances, as applicable, along the substitute routes is made by reference to two criteria, namely first that the substitute route does not pass along the link which has failed and (the substitute route must satisfy the condition that it represents a REAL substitute for the failed link) secondly that the substitute route is optimal according to some metric which is used locally. In effect, the substitute route provides for the routing of data packets a substitution for the link which has failed. One metric for determining the best alternative route when there are several options for determining an alternative route could, for example, take into account such criteria as the number of hops to a destination. The metric used in each case is local insofar as the routing strategies of other routing domains, which are not known to the routing domain concerned, are not taken into consideration. It is to be recommended, above all in respect of the different routing strategies or policies, that several alternative routes are identified or selected, as appropriate, for a route which has failed, and several substitute routes are provided. This combination can also be described as an array of alternative routes or an array of substitute routes. The usefulness of several substitute routes will be explained in more detail by reference to FIG. 4. This figure shows autonomous systems AS-1 to AS-7. Suppose the link between autonomous systems AS-1 and AS-4, shown as a dashed line, has failed. From the autonomous system AS-1 to autonomous system AS-4, two substitute routes are now provided, passing respectively through the autonomous system AS-2 or the autonomous system AS-3. The autonomous systems AS-5, AS-6 and AS-7 can be reached via the autonomous system AS-4. Assume that data packets which are transmitted from the autonomous system AS-1 to the autonomous system AS-7 are not to be transmitted via the autonomous system AS-2, for example because on contractual grounds the operator of autonomous system AS-2 does not forward traffic of this type, or because he is of a different nationality so that security considerations mean that traffic of this type should not be forwarded via his routing domain. For this case, a second route is available, namely via the autonomous system AS-3, over which traffic can be forwarded to the autonomous system AS-7. The two different routes, via the autonomous systems AS-2 and AS-3, can be selected depending on the autonomous system to which the traffic is to be transmitted, for example AS-5, AS-6 and AS-7, and depending on the routing strategy of the destination network concerned. The provision of several substitute routes can in this way contribute to taking into account the routing strategy in routing the traffic along a substitute route.

The invention claimed is:

1. A method for rapidly responding to the failure of a link between two routing domains in a packet-oriented network, comprising:
   detecting the failure of the link by one of the routing domains; and
   providing at least one substitute route to a destination point for at least one route to the destination point, which passes via the failed link, wherein
   a message about the link failure is propagated only along the at least one substitute route, by means of which routing domains lying along the substitute route are notified, and wherein
   routing domains which have been notified and which lie along the at least one substitute route adjust their inter-domain routing to give a routing to the destination point along the at least one substitute route, until all the routing domains on the at least one substitute route have adjusted their inter-domain routing to give a routing to the destination point along the at least one substitute route.

2. The method in accordance with claim 1, further comprising:
   notifying a router in a routing domain about the link failure;
   selecting an alternative route to the route which passes via the failed link, which does not pass via the failed link by the router;
   specifying an address of a router in the next routing domain on the alternative route as the next destination for the inter-domain routing to the destination point; and
   sending a message to the next routing domain on the alternative route, notifying the next routing domain about the link failure.

3. The method in accordance with claim 1, wherein
   a router in a routing domain is notified about the link failure, wherein
   for a route which passes via the failed link, the router checks whether a substitute route has already been set up, and wherein,
   if there is such a substitute route, no message about the link failure will be sent to the next routing domain on the substitute route.

4. The method in accordance with claim 2, wherein
   a router in a routing domain is notified about the link failure, wherein
   for a route which passes via the failed link, the router checks whether a substitute route has already been set up, and wherein,
   if there is such a substitute route, no message about the link failure will be sent to the next routing domain on the substitute route.

5. The method in accordance with claim 1, wherein
   a router in a routing domain is notified about the link failure, wherein
   for each of the routes which pass via the failed link, the router selects alternative routes which do not pass via the failed link, and wherein
   the address of a router belonging to the next routing domain along the alternative route concerned is determined as the next destination for the inter-domain routing to the destination point of the route concerned which has failed.

6. The method in accordance with claim 2, wherein
   a router in a routing domain is notified about the link failure, wherein
   for each of the routes which pass via the failed link, the router selects alternative routes which do not pass via the failed link, and wherein
   the address of a router belonging to the next routing domain along the alternative route concerned is determined as the next destination for the inter-domain routing to the destination point of the route concerned which has failed.

7. The method in accordance with claim 3, wherein
a router in a routing domain is notified about the link failure, wherein
for each of the routes which pass via the failed link, the router selects alternative routes which do not pass via the failed link, and wherein
the address of a router belonging to the next routing domain along the alternative route concerned is determined as the next destination for the inter-domain routing to the destination point of the route concerned which has failed.

8. The method in accordance with claim 1, wherein
a router selects more than one alternative route to a route which passes via the failed link, such that the selected alternative routes do not pass via the failed link, and wherein
an address of a router which belongs to the next routing domain on an alternative route is determined as the next destination for the routing to the destination point of the failed link and for at least one further alternative route the address of a further router which belongs to the next routing domain on the further alternative route is determined as the alternative next destination for the inter-domain routing to the destination point.

9. The method in accordance with claim 2, wherein
a router selects more than one alternative route to a route which passes via the failed link, such that the selected alternative routes do not pass via the failed link, and wherein
an address of a router which belongs to the next routing domain on an alternative route is determined as the next destination for the routing to the destination point of the failed link and for at least one further alternative route the address of a further router which belongs to the next routing domain on the further alternative route is determined as the alternative next destination for the inter-domain routing to the destination point.

10. The method in accordance with claim 3, wherein
a router selects more than one alternative route to a route which passes via the failed link, such that the selected alternative routes do not pass via the failed link, and wherein
an address of a router which belongs to the next routing domain on an alternative route is determined as the next destination for the routing to the destination point of the failed link and for at least one further alternative route the address of a further router which belongs to the next routing domain on the further alternative route is determined as the alternative next destination for the inter-domain routing to the destination point.

11. The method in accordance with claim 5, wherein
a router selects more than one alternative route to a route which passes via the failed link, such that the selected alternative routes do not pass via the failed link, and wherein
an address of a router which belongs to the next routing domain on an alternative route is determined as the next destination for the routing to the destination point of the failed link and for at least one further alternative route the address of a further router which belongs to the next routing domain on the further alternative route is determined as the alternative next destination for the inter-domain routing to the destination point.

12. The method in accordance with claim 1, wherein
a router selects more than one alternative route to a route which passes via the failed link, whereby the selected alternative routes do not pass via the failed link, wherein
an address of a router which belongs to the next routing domain on a first alternative route is determined as the next destination for the routing to the destination point of the route which passes via the failed link, and for at least one second alternative route the address of a router which belongs to the next routing domain on the second alternative route is also determined as the next destination for the inter-domain routing to the destination point, and wherein
for inter-domain routing over a substitute route for the route which passes via the failed link, the next destination is determined by reference to parameters which relate to data packets.

13. The method in accordance with claim 2, wherein
a router selects more than one alternative route to a route which passes via the failed link, whereby the selected alternative routes do not pass via the failed link, wherein
an address of a router which belongs to the next routing domain on a first alternative route is determined as the next destination for the routing to the destination point of the route which passes via the failed link, and for at least one second alternative route the address of a router which belongs to the next routing domain on the second alternative route is also determined as the next destination for the inter-domain routing to the destination point, and wherein
for inter-domain routing over a substitute route for the route which passes via the failed link, the next destination is determined by reference to parameters which relate to data packets.

14. The method in accordance with claim 1, further comprising:
providing a protocol which provides a network-wide propagation of messages for determining or calculating optimal routes, wherein,
after a link failure, any redetermination of the optimal routes for inter-domain routing to take into account the link failure is suppressed for a time period by the protocol.

15. The method in accordance with claim 14, wherein, after the time period has expired, a network-wide propagation of messages for the determination of optimal routes for inter-domain routing is then undertaken if the link failure is still extant.

16. The method in accordance with claim 14, wherein the protocol used for the redetermination of optimal routes is the Border Gateway Protocol (BGP) protocol.

17. The method in accordance with claim 1, wherein a route which has been replaced by an alternative route is marked with respect to its possible reconnection or restoration to service.

18. A router comprising mechanisms for carrying out the method of the claim 1.

* * * * *